US007499035B2

(12) United States Patent
Kolmykov-Zotov et al.

(10) Patent No.: US 7,499,035 B2
(45) Date of Patent: Mar. 3, 2009

(54) FOCUS MANAGEMENT USING IN-AIR POINTS

(75) Inventors: Alexander J. Kolmykov-Zotov, Sammamish, WA (US); Shiraz Somji, Kenmore, WA (US); Rudolph Balaz, Redmond, WA (US); Sam J. George, Duvall, WA (US); Brigette Krantz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 229 days.

(21) Appl. No.: 10/644,899

(22) Filed: Aug. 21, 2003

(65) Prior Publication Data

US 2005/0052434 A1    Mar. 10, 2005

(51) Int. Cl.
*G09G 5/00* (2006.01)
(52) U.S. Cl. .................................. 345/173; 178/18.03
(58) Field of Classification Search ................ 715/754, 715/224–226; 345/179, 169, 173; 178/18.01, 178/18.03
See application file for complete search history.

(56) References Cited

U.S. PATENT DOCUMENTS

| | | | |
|---|---|---|---|
| 5,559,942 A | | 9/1996 | Gough et al. |
| 5,634,102 A | | 5/1997 | Capps |
| 5,754,169 A | * | 5/1998 | Yashiro ....................... 345/173 |
| 5,900,869 A | * | 5/1999 | Higashio ..................... 715/751 |
| 5,905,486 A | * | 5/1999 | Brittenham et al. ......... 345/157 |
| 6,049,329 A | * | 4/2000 | Zetts et al. .................. 345/179 |
| 6,073,036 A | * | 6/2000 | Heikkinen et al. ........ 455/550.1 |
| 6,128,007 A | * | 10/2000 | Seybold ...................... 345/179 |
| 6,239,789 B1 | * | 5/2001 | Sekizawa et al. ............ 345/173 |
| 6,292,857 B1 | | 9/2001 | Sidoroff et al. |
| 6,313,853 B1 | | 11/2001 | Lamontagne et al. |
| 6,611,258 B1 | | 8/2003 | Tanaka et al. |
| 2002/0013795 A1 | | 1/2002 | Dresevic et al. |

(Continued)

FOREIGN PATENT DOCUMENTS

JP        09190268 A      7/1997

OTHER PUBLICATIONS

Internet printout: Fox Tool Kit Documentation: Keyboard Focus http://www.fox-toolkit.org/focus.html, Jul. 21, 2003.

(Continued)

*Primary Examiner*—Richard Hjerpe
*Assistant Examiner*—Tom V Sheng
(74) *Attorney, Agent, or Firm*—Woodcock Washburn LLP (57) ABSTRACT

Stylus "focus" designates or establishes an element or area of a computer interface to receive input (e.g., such as electronic ink). Focus may be used, for example, to prepare the associated element to receive input by "waking" the system from a "stand-by" mode; by triggering increased digitizer polling frequency; by setting up data structures or allocating memory resources to receive input; retrieving data relating to the input or characteristics thereof, etc. Systems, methods, and computer-readable media for managing stylus focus may include: (a) receiving input indicating that a stylus is located proximate a digitizer; and (b) providing focus to a control element corresponding to the stylus location, e.g., when the stylus is located proximate to and/or in contact with the digitizer. If desired, stylus focus may be maintained separate from and/or concurrent with mouse and/or keyboard focus. Additionally, such systems and methods may accept input from multiple styli and independently and concurrently provide stylus focus with respect to control elements corresponding to the location of each stylus.

72 Claims, 6 Drawing Sheets

U.S. PATENT DOCUMENTS

2002/0049796 A1     4/2002  Dresevic et al.
2005/0024341 A1*    2/2005  Gillespie et al. ............ 345/173
2005/0039137 A1*    2/2005  Bellwood et al. ........... 715/801
2005/0160371 A1*    7/2005  Karson et al. ............... 715/777

OTHER PUBLICATIONS

Internet printout: Handling Keyboard Focus, http://developer.apple.com/documentation/macos8/HumanInterface_Toolbox/, Jul. 21, 2003.

Internet printout: Keyboard Focus Overview, http://doc.trolltech.com/3.0/focus.html, Jul. 21, 2003.

Internet printout: The Keyboard Focus Model, http://w3.pppl.gov/misc/motif/MotifStyleGuide/en_US/The_Keyboard_Focus_Model.html, Jul. 21, 2003.

Internet printout: Keyboard Focus, http://www.-h.eng.cam.ac.uk/help/tpl/new_user/desktop/nodel14.html, Jul. 21, 2003.

Internet printout: Input, Focus, and Keyboard Navigation, http://w3.pppl.gov/misc/motif/MotifProgGuide/en_US/Input,_Focus,_and , Jul. 21, 2003.

Supplementary European Search Report dated Aug. 7, 2006.

Office Action issued by the Russian Federation Patent Office in Application No. 2004117906, Aug. 11, 2007, 9 pages.

International Search Report; Feb. 12, 2004.

* cited by examiner

FOCUS MANAGEMENT USING IN-AIR POINTS

FIELD OF THE INVENTION

The present invention generally relates to systems, methods, and computer-readable media with computer-executable instructions stored thereon for providing stylus focus in a pen-based computing system or other computing systems.

BACKGROUND

Typical computer systems, especially computer systems using graphical user interfaces (GUIs), are optimized for accepting user input from one or more discrete input devices, such as a keyboard for entering text, and a pointing device, such as a mouse with one or more buttons, for operating the user interface. An example of such a GUI is the user interface for the Windows® computer operating system (available from Microsoft Corporation of Redmond, Wash.). The ubiquitous keyboard and mouse interface provides for fast creation and modification of documents, spreadsheets, database fields, drawings, photos, and the like.

Figure 3:
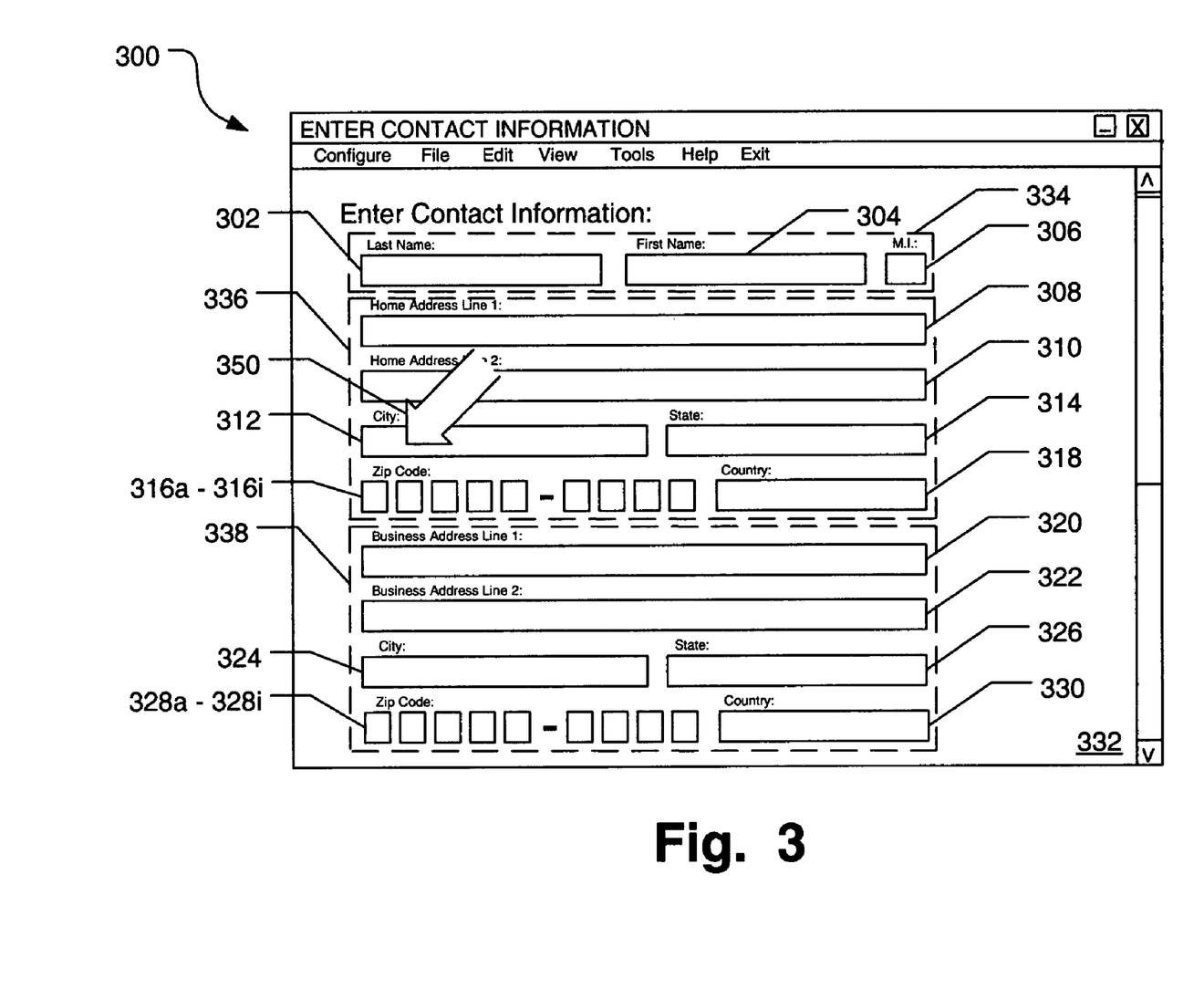
FIG. 3 illustrates an example rendering of a user interface in which stylus focus can be achieved according to some examples of this invention.

In GUIs, several individual and/or independent "control elements" (also called "user interface elements" in this specification) may be visible on the screen and/or available in the interface at a given time (see, for example, control elements 302-330 in the interface screen 300 of FIG. 3). User interfaces for typical GUIs have used the concept of "keyboard focus" to determine and establish which control element of the interface will receive keystrokes typed into the computer system by the user (or receive other input, e.g., from another source). In at least some instances, the appearance of the user interface element having keyboard focus will change in some manner as a visual indication to the user of the ultimate destination of future keystrokes or other input. Through the use of keyboard focus, users can quickly and easily determine where the next keyboard strokes or other input will go, and they can make any necessary or desired changes to the focus (e.g., by tabbing the input cursor from one control element to another and/or by clicking a mouse button within the representation of a different control element). If no element of the user interface has keyboard focus, the computer system typically will ignore input keystrokes until keyboard focus is established in one of the available control elements.

Recently, pen-based computing systems, such as tablet PCs and the like, have been increasing in popularity. In pen-based computing systems, user input advantageously may be introduced using an electronic "pen" or stylus (e.g., akin to writing with a pen or pencil on a piece of paper). Indeed, in at least some pen-based computing systems, all user input is capable of being entered and manipulated using an electronic pen, and the user interface is fully controllable using only the electronic pen. In such systems, the use of traditional "keyboard focus" may not be possible or convenient, at least in all situations, for example, because electronic pens for pen-based computing systems typically do not have "tab" keys or other buttons that enable establishment of a focus region in the same manner as a keyboard or mouse.

Establishing focus by "tapping" an electronic pen in a desired control element or pressing a button on the pen (if any) while hovering over the desired control element, while effective, would not provide a very satisfying or natural user experience. For example, when filling out a form using a pen-based computing system (like the form illustrated in FIG. 3), a user may be required to tap the electronic pen in each control element box of the form (e.g., inside control elements 302-330) to establish focus in that element prior to entering electronic ink data into that control element box. Failure to tap in the control element box prior to writing to enter electronic ink may result in non-receipt, non-acceptance, or incomplete receipt of the electronic ink data and/or misdirection of the input ink data. The user may not notice immediately that the system is not correctly receiving or accepting the ink, thereby requiring re-writing of the data and/or other corrective action. Additionally, the need to tap in a control element box before writing in it is not a natural writing experience. These factors will tend to frustrate the user and degrade from the user's experience with the pen-based computing system.

Additionally, many control elements 302-330 in user interfaces 300 are relatively small sized. While this is not a problem when a user types input information into the control elements 302-330 using a keyboard (the type face can be appropriately and automatically sized to fit into the control element), the small size can cause difficulties when the user attempts to handwrite information into the control element using an electronic pen. These difficulties may result in incomplete and/or non-entry of the data, a result that also is frustrating to users of electronic ink and pen-based computing systems. Other systems that provide a "writing pad" separate from the control element box where the data eventually appears (like some handheld or pocket-sized computing devices) also do not provide a natural writing experience.

Accordingly, there is a need in the art for an easy, natural, and trustworthy way of establishing "stylus focus" and entering input data for use in pen-based computing systems and other devices that accept input in the form of electronic ink and/or from an electronic pen or stylus.

SUMMARY

Aspects of the present invention relate to systems, methods, and computer-readable media for providing and/or managing stylus focus in pen-based computing systems or other devices that accept input in the form of electronic ink and/or from an electronic pen or stylus. Such systems and methods may include: (a) receiving input (e.g., via an input device associated with a digitizer) indicating that a stylus is located proximate to a digitizer; and (b) providing focus to a control element corresponding to a location of the stylus (e.g., using a computer processor), for example, either: (i) when the stylus is located proximate to the digitizer and/or (ii) when the stylus actually contacts the digitizer surface. Establishment of focus may be used for any suitable purpose without departing from the invention, including: to prepare the associated control element to receive input (e.g., to receive electronic ink or other input); to "wake" the system from a low-power and/or stand-by mode; to trigger an increase in digitizer polling frequency in an effort to detect input data; and/or to trigger any other desired or suitable processing. If desired, stylus focus may be maintained separate from and/or concurrent with mouse focus and/or keyboard focus. Additionally, stylus focus need not be limited in the computing system to a single control element with a single stylus focus. Rather, systems and methods according to at least some examples of this invention may accept input from multiple styli and independently and concurrently provide and/or maintain separate stylus focus with respect to control elements corresponding to the location of each stylus. Additional aspects of the invention relate to computer-readable media including computer-executable instructions stored thereon for performing various methods and/or operating various systems, including systems and methods like those described above.

BRIEF DESCRIPTION OF THE DRAWINGS

The above and other objects, features, and advantages of the present invention will be readily apparent and fully understood from the following detailed description, taken in connection with the appended drawings, in which.

DETAILED DESCRIPTION

As described above, aspects of the present invention relate to systems, methods, and computer-readable media for providing stylus focus in operation of pen-based computing systems and other devices that accept input in the form of electronic ink and/or from an electronic pen or stylus. The following description is divided into sub-sections to assist the reader. The sub-sections include: Terms; General Description of Various Aspects of the Invention; Example Hardware; Example Systems, Methods, and Computer-Readable Media According to the Invention; and Conclusion.

I. Terms

The following terms are used in this specification and, unless otherwise specified or clear from the context, the terms have the meanings provided below:

"Pen"—Any type of user input device useful in entering ink into and/or otherwise manipulating or controlling an electronic document. The terms "pen" and "stylus" are used interchangeably in this specification.

"Pen-Down Event"—An event that is initiated at the time a pen contacts a digitizer.

Typically, a pen-down event will end at the time the pen leaves the digitizer surface (also called a "pen-up event" in this specification).

"Hover"—Positioning or locating a pen proximate or adjacent to a digitizer surface but not in contact with the surface. No specific time period or cessation of motion at a particular location or position is necessary to constitute a "hover" action. For example, a "hover" may occur during the time period that the user continuously moves the pen toward and into contact with the digitizer surface.

"Focus"—Designating or establishing an element, area, or portion of a user interface for receiving input (e.g., the target area or element for receiving input). In some instances, the entire visible portion or input area of the interface and/or the entire interface may have focus.

"Render" or "Rendered" or "Rendering"—The process of determining how information (including text, graphics, and/or electronic ink) is to be displayed, whether on a screen, printed, or output in some other manner.

"Computer-Readable Medium" means any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

II. General Description of Various Aspects of the Invention

Aspects of the present invention relate to systems and methods for managing stylus focus in pen-based computing systems or other devices that accept input as electronic ink and/or from a pen or stylus. Such systems and methods may include: (a) receiving input (e.g., via an input device associated with a digitizer) indicating that a stylus is located proximate to a digitizer; and (b) providing focus to a first control element corresponding to a location of the stylus (e.g., using a computer processor). In at least some examples of the invention, the input indicating the presence of the stylus initially will be received when the stylus is located near a surface of the digitizer but before it actually contacts the digitizer surface. In use, the stylus may continue moving toward the digitizer surface, and, once it contacts the surface, the digitizer may accept input (e.g., as electronic ink or other input) in an area of the digitizer representing the control element having focus.

Additional and/or alternative aspects of this invention relate to systems and methods for managing stylus focus that include: (a) determining whether a first stylus is located proximate to a surface of a digitizer (e.g., via an input device associated with a digitizer); and (b) providing focus to a first control element corresponding to a location of the first stylus (e.g., using a computer processor) in response to: (i) a determination that the first stylus is located proximate to the digitizer, or (ii) contact between the first stylus and the surface of the digitizer. In systems and methods according to at least some of these aspects of the invention, stylus focus can immediately be established in any available control element if the initial indication of stylus presence occurs when the stylus actually contacts the surface of the digitizer in an available control element.

Establishment of focus may be used for any purpose without departing from the invention, including conventional reasons and purposes associated with establishing keyboard and/or mouse focus, as are known in the art. In some examples of systems and methods according to the invention, establishment of focus may be used to prepare the associated control element to receive input (e.g., to prepare an input area to receive electronic ink or other input; to retrieve and/or accept data indicating various characteristics of the incoming data, such as data type (ink, erasure, highlight, selection, etc.); and the like). Alternatively, when stylus focus is established in at least some examples of the invention, this may "wake" the system from a low-power and/or stand-by mode and initiate a more active processing mode. As another specific example, establishment of stylus focus may be used as a trigger to the system to increase digitizer polling frequency looking for input data (e.g., looking for new input electronic ink or other input), optionally at least in an area of the digitizer associated with the control element receiving the focus. Any other suitable or desired processing may be triggered when stylus focus is achieved without departing from the invention.

In at least some examples of systems and methods according to the invention, when the stylus moves away from the digitizer without contacting its surface such that the input indicating stylus proximity is no longer received, focus from the first control element may be withdrawn. As another alternative, when the stylus moves away as described above, focus may be maintained with the first control element at least until a new focus location is established. As still another alternative, when the stylus moves away as described above, focus may be maintained with the first control element for a predetermined time period and then either withdrawn if no new focus location is established or reestablished with a new control element if and when a new focus is established. Focus may change from control element to control element as the stylus hovers and moves across the user interface.

The location or establishment of stylus focus with respect to control elements represented on the digitizer screen or in the user interface may be established in any appropriate manner without departing from the invention. For example, the control element receiving stylus focus may be established by determining the identity of the control element (if any) located immediately adjacent to the stylus as the stylus hovers near but not in contact with the digitizer surface and then providing focus to that control element. If that control element is not itself stylus focusable, but it is contained within a control element that is stylus focusable, then stylus focus may be assigned to one of its "container" or "parent" elements.

Establishment of stylus focus also may be communicated to users, in at least some examples of the invention, in any manner without departing from the invention. For example, focus may be indicated by a color change, interface style change, layout change, or other visual indication associated with the control element receiving focus. As another example, a cursor or pointing element may appear and/or its appearance may change when present in an element having stylus focus as compared to its appearance at other locations in the interface. As still another example, an audio indicator may advise users of stylus focus establishment. In some more specific examples, establishment of stylus focus may be indicated by rendering an enlarged view of at least a portion of a representation of the control element receiving the focus. Enlarging the representation of the control element may be useful to provide an enlarged area for entering input directed to the control element having focus (e.g., an enlarged area for entering electronic ink or other input). Other indicators and/or combinations of the above indicators also are possible without departing from the invention. Also, if desired, no visual, audio, or other indicator of establishment of stylus focus is needed.

If desired, in at least some examples of systems and methods according to this invention, stylus focus may be maintained separate from and/or concurrent with mouse focus and/or keyboard focus. Additionally, in at least some examples, stylus focus need not be limited to focus in a single control element and/or focus associated with a single physical stylus. More specifically, systems and methods according to at least some examples of this invention may accept input from multiple styli and independently and concurrently provide and maintain separate stylus focus with respect to control elements corresponding to the location of each stylus.

Additional aspects of the invention relate to computer-readable media including computer-executable instructions stored thereon for performing various methods and/or operating various systems, including systems and methods like those described above.

III. Example Hardware

Figure 1:
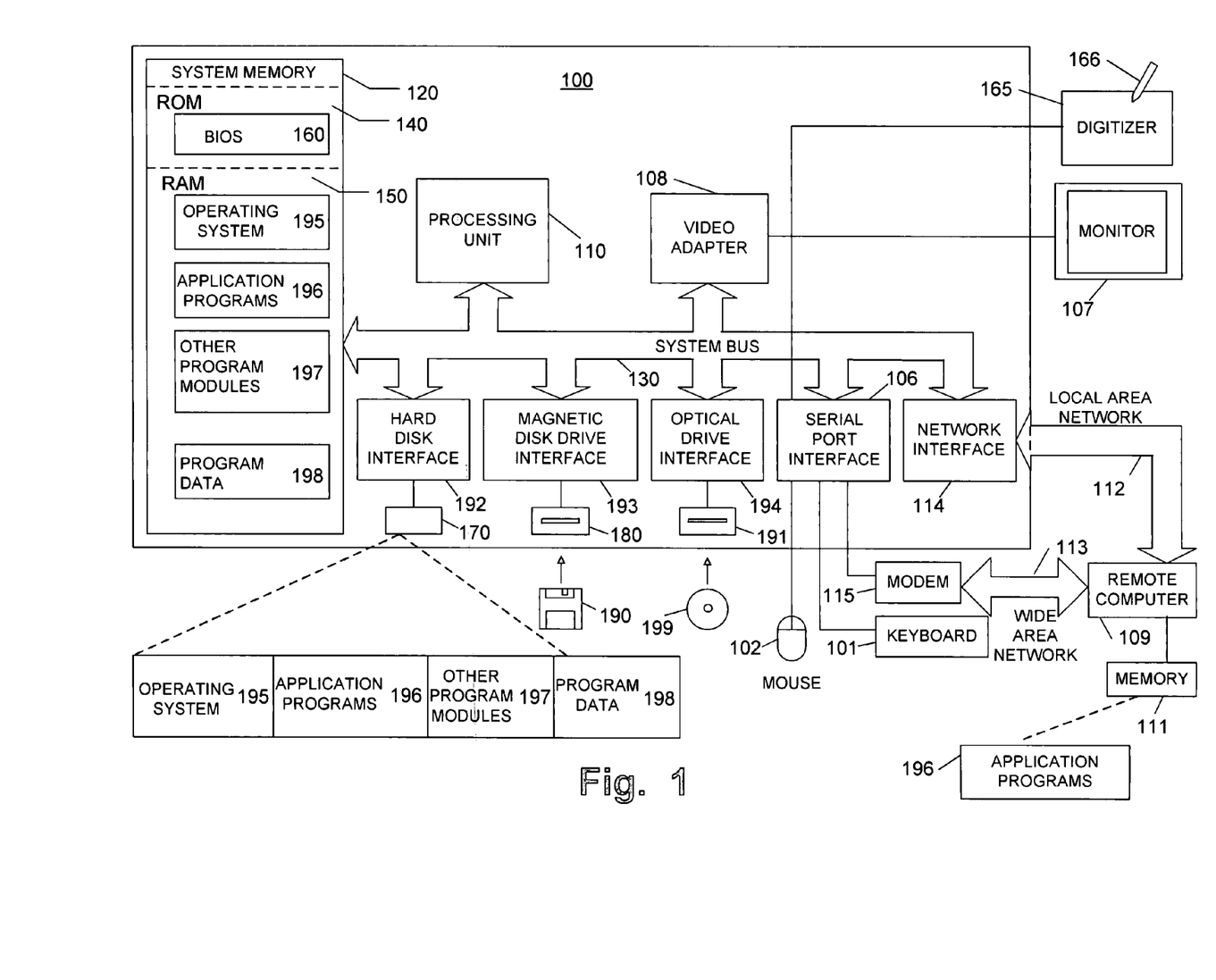
FIG. 1 illustrates a schematic diagram of a general-purpose digital computing environment in which certain aspects of the present invention may be implemented.

FIG. 1 illustrates a schematic diagram of a general-purpose digital computing environment that can be used to implement various aspects of the present invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), contains the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide non-volatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140, or RAM 150, including an operating system 195, one or more application programs 196, other program modules 197, and program data 198. A user can enter commands and information into the computer 100 through input devices, such as a keyboard 101 and a pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows an exemplary environment, it will be understood that other computing environments also may be used. For example, one or more examples of the present invention may use an environment having fewer than all of the various aspects shown in FIG. 1 and described above, and these aspects may appear in various combinations and subcombinations that will be apparent to one of ordinary skill.

Figure 2:
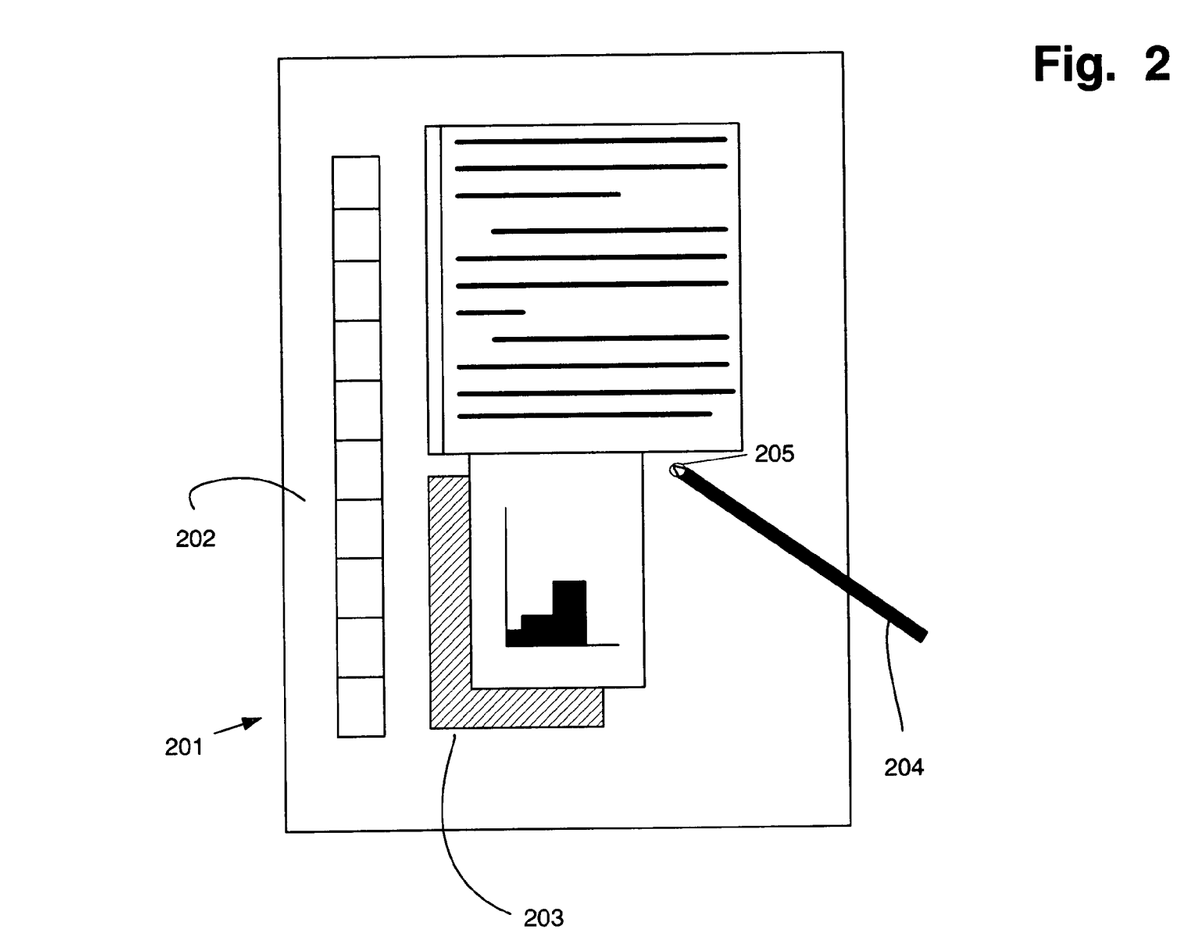
FIG. 2 illustrates a pen-based personal computing (PC) environment in which certain aspects of the present invention may be implemented.

FIG. 2 illustrates a pen-based personal computer (PC) 201 that can be used in accordance with various aspects of the present invention. Any or all of the features, subsystems, and functions in the system of FIG. 1 can be included in the computer of FIG. 2. The pen-based personal computer system 201 includes a large display surface 202, e.g., a digitizing flat panel display, such as a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as pen digitizers available from Mutoh Co. (now known as FinePoint Innovations Co.) or Wacom Technology Co. Other types of pen digitizers, e.g., optical digitizers, may also be used. The pen-based computing system 201 interprets gestures made using stylus 204 in order to manipulate data, enter text, and execute conventional computer application tasks, such as creating, editing, and modifying spreadsheets, word processing programs, and the like.

The stylus 204 may be equipped with buttons or other features to augment its capabilities. In one example, a stylus 204 could be implemented as a "pencil" or "pen", in which one end constitutes a writing portion and the other end constitutes an "eraser" end, and which, when moved across the display, indicates portions of electronic ink on the display that are to be erased. Other types of input devices, such as a mouse, trackball, keyboard, or the like also could be used. Additionally, a user's own finger could be used for selecting or indicating portions of the displayed image on a touch-sensitive or proximity-sensitive display. Consequently, the term "user input device," as used herein, is intended to have a broad definition and encompasses many variations on well-known input devices.

In various examples, the system provides an ink platform as a set of COM (component object model) services that an application program can use to capture, manipulate, and store ink. The ink platform also may include a mark-up language including a language like the extensible markup language (XML). Further, the system may use DCOM as another implementation. Yet further implementations may be used including the Win32 programming model and the Net programming model from Microsoft Corporation. These platforms are commercially available and known in the art.

In addition to use with full performance pen-based computing systems or "tablet PCs" (e.g., convertible laptops or "slate" type tablet PCs), aspects of this invention can be used in conjunction with other types of pen-based computing systems and/or other devices that accept data as electronic ink and/or accept electronic pen or stylus input, such as: handheld or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus.

The invention now will be described in conjunction with the remaining figures, which illustrate various examples of the invention and information to help explain the invention. The specific figures and information contained in this detailed description should not be construed as limiting the invention.

IV. Example Systems, Methods, and Computer-Readable Media According to the Invention As described above, aspects of the present invention relate generally to systems and methods for managing "stylus focus" in pen-based computing systems and/or other devices that accept electronic ink as input data and/or accept input data from a pen or stylus. A primary purpose of device "focus" is to determine and/or establish which user interface element will receive incoming input. FIG. 3 illustrates an example of a user interface screen 300 as it typically may appear in a graphical user interface. In the example illustrated in FIG. 3, the screen 300 requests contact information from a user to be entered in various different control elements 302-330 (although those skilled in the art will recognize that any data or information may be introduced without departing from the invention). As noted above, for keyboard input, the keyboard focus may be set to and/or changed among the various different control elements 302-330 using the "TAB" key and tabbing to the next control element 302-330 and/or by clicking on or in the representations of the specific user interface elements 302-330 using a mouse. As another alternative, keyboard focus may be set automatically within a specific control element 302-330 by the application program (e.g., for setting an initial keyboard focus).

Computer mice also may have an associated "focus." Typically, a mouse can be moved freely over a user interface screen 300 (e.g., conventional mouse movement without clicking down the right or left mouse buttons), and this movement of the mouse causes movement of a pointer element associated with the mouse within the interface screen 300 (e.g., movement of an arrowhead, cursor, or other pointer element). In such systems, mouse focus may correspond to the user interface element 302-330 whose representation is located directly under or behind the mouse pointer element, and this focus may change freely as the mouse pointer element moves across the interface screen 300. The specific control element 302-330 receiving "mouse focus" may be determined by doing "hit testing" and comparing the (X, Y) coordinates of the mouse pointer location against coordinates or other information associated with the locations of the representations of the user interface elements 302-330 on the user interface screen 300 and determining which user interface element representation 302-330 (if any) is under or behind the pointer element. The user interface element 302-330 corresponding to the (X, Y) coordinates of the mouse pointer location can be determined (if any), and that element 302-330 (if any) may be designated to get the focus. Any desired visual or other indicator of the establishment of "mouse focus" may be used, or, if desired, no indicator is needed.

Establishing and managing "stylus focus" in pen-based computing systems/or other devices or system, however, provides some significant differences and challenges from establishing and managing "mouse focus" or "keyboard focus." A stylus differs from a mouse and a keyboard in some significant ways. For example, a stylus is an absolute pointing device (it can only directly point at and interact with elements 302-330 on the screen 300), whereas a mouse is a relative pointing device (it can be scrolled to areas initially located off the screen 300 by continued rolling of the mouse). The mouse's pointing element always is detectable by the computer system, and it always is located within the visible confines of the user interface screen 300 (although the actual elements visible on the screen may change as the mouse moves). A stylus (which itself constitutes a pointing element), on the other hand, may be in direct contact with the user interface screen surface 332, or it may be positioned away from the user interface screen surface 332. Additionally, the stylus may be located at a position where it can be detected or sensed by the digitizer, or it may be located away from the digitizer and out of range for such detection. Also, once located within a mouse or keyboard focused control element 302-330, the input (from either the keyboard or another source) is fixedly directed into that control element 302-330. Attempted input from a stylus (e.g., in the form of electronic ink), on the other hand, may begin inside a control element 302-330 having stylus control but then move outside of that control element 302-330 as the user attempts to write and/or otherwise enter input data (e.g., into another focusable control element region or into an unfocusable region). Additionally, attempted input from a stylus may begin outside of all focusable control elements 302-330 on the interface and then move inside a focusable control element 302-330 as the user attempts to write and/or otherwise enter input data. Finally, at least some styli do not have "buttons" (akin to the "TAB" key on a keyboard or a left mouse button) that enable positive setting, activation, or alteration of focus with respect to control elements 302-330. Even if present, however, pressing a button on a stylus while in contact with or hovering a short distance (e.g., one-half to two inches) from a desired control element 302-330 in which stylus focus is to be established, prior to beginning writing or entering data in that control element 302-330, does not provide a natural or smooth user experience.

In accordance with at least some examples of the present invention, in at least some instances, code will be executed by the operating system and/or application program to establish stylus focus in the control element 302-330 of the user interface 300 whose representation is located immediately beneath or adjacent the tip of the stylus when the stylus hovers adjacent to the user interface surface 332 and is located within a detection range of the digitizer. A stylus may be detectable by a digitizer while hovering adjacent to its surface 332 in any manner without departing from the invention, including in conventional manners known to those skilled in the art. For example, some styli are "active," which in this specification means that they transmit, reflect, alter, or otherwise modify energy, data, or other information transmitted by and/or detectable by a digitizer when the styli are located near the digitizer surface 332. As examples, some styli may include circuitry or other structures that receive energy emitted by the digitizer and/or alter magnetic or electronic fields transmitted by and/or sensed by the digitizer, such that the presence of the styli can be sensed by the digitizer due to changes in detected magnetic or electric fields. As another example, some styli may transmit or reflect data, electrical or magnetic fields, or other energy or information that is detectable by the digitizer. Any suitable or desired way of sensing or detecting the presence of a stylus when it is located near a user interface screen surface 332 may be used without departing from this invention. Although a stylus and digitizer combination may be designed to allow detection of a stylus at virtually any reasonable position with respect to the digitizer surface, in at least some conventional pen-based computing systems with active pens, the stylus is initially detectable when it is about one-half to two inches from the digitizer surface, and in some examples, when it is approximately a half inch to an inch from the digitizer surface.

One example of establishing and managing stylus focus in accordance with the present invention now will be described in conjunction with FIG. 4. Assume, at the start S400, that the stylus starts outside of the digitizer's detection range such that the presence of the stylus is not detectable by the system. At this point in time, no user interface element 302-330 will have stylus focus in this example. At S402, the system checks to determine whether a stylus (or pen) is detected near the surface 332 of the digitizer. If "No," the process returns to S402, and a short time later the system will again check for the presence of a stylus near the digitizer surface 332.

If a stylus is detected at S402 (answer "Yes" at S402, e.g., when the user moves the stylus near the surface 332 of the digitizer when approaching to write on it), the systems and methods according to this example of the invention then generate an "in-air" point (S404) corresponding to the surface 332 location of the stylus as it hovers near (or approaches) the surface 332. The "in-air" point may correspond, for example, to the point (e.g., (X, Y) coordinate) on the surface 332 of the digitizer closest to the stylus tip; the point where the detected electrical or magnetic field is the strongest, weakest, or most changed; the point of detection of a focused beam emitted by or reflected from the stylus; or the like. Any manner of detecting and establishing "in-air" points may be used without departing from the invention. Once a stylus is detected in this manner, various characteristics associated with the stylus and/or the incoming input data may be retrieved by and/or input into the application program and/or computing system, such as ink color; stroke width; stroke type (input ink strokes, erasure strokes, highlighting strokes, selection, etc.); stylus ID information; user ID information; and the like.

The "in-air" points (e.g., the (X, Y) coordinates of the stylus's hover location) may be used by systems and methods according to at least some examples of the invention to perform "hit-testing," which may be used to determine which control element 302-330 should receive stylus focus. In at least some user interfaces, control elements 302-330 or other items in the interface 300 may be arranged in a hierarchical manner. FIG. 3 illustrates an example of this type of hierarchical arrangement. For example, as shown in FIG. 3, control elements 302-306 may fall within a common "Name" control element 334. Similarly, control elements 308-318 may fall within a common "Home Address" control element 336, and control elements 320-330 may fall within a common "Business Address" control element 338. All of these control elements may fall within a common parent control element (e.g., the "ENTER CONTACT INFORMATION" element), which itself may fall within one or more additional parent control elements. Accordingly, if stylus focus cannot be provided to an element directly adjacent the stylus's "in-air" point (e.g., if the stylus is located between individual control elements 302-330), systems and methods according to some examples of this invention, in at least some instances, still may be able to provide stylus focus to a larger "parent" or "container" element (e.g., like elements 334, 336, or 338) that corresponds to the in-air point at which the stylus is located.

Figure 5:
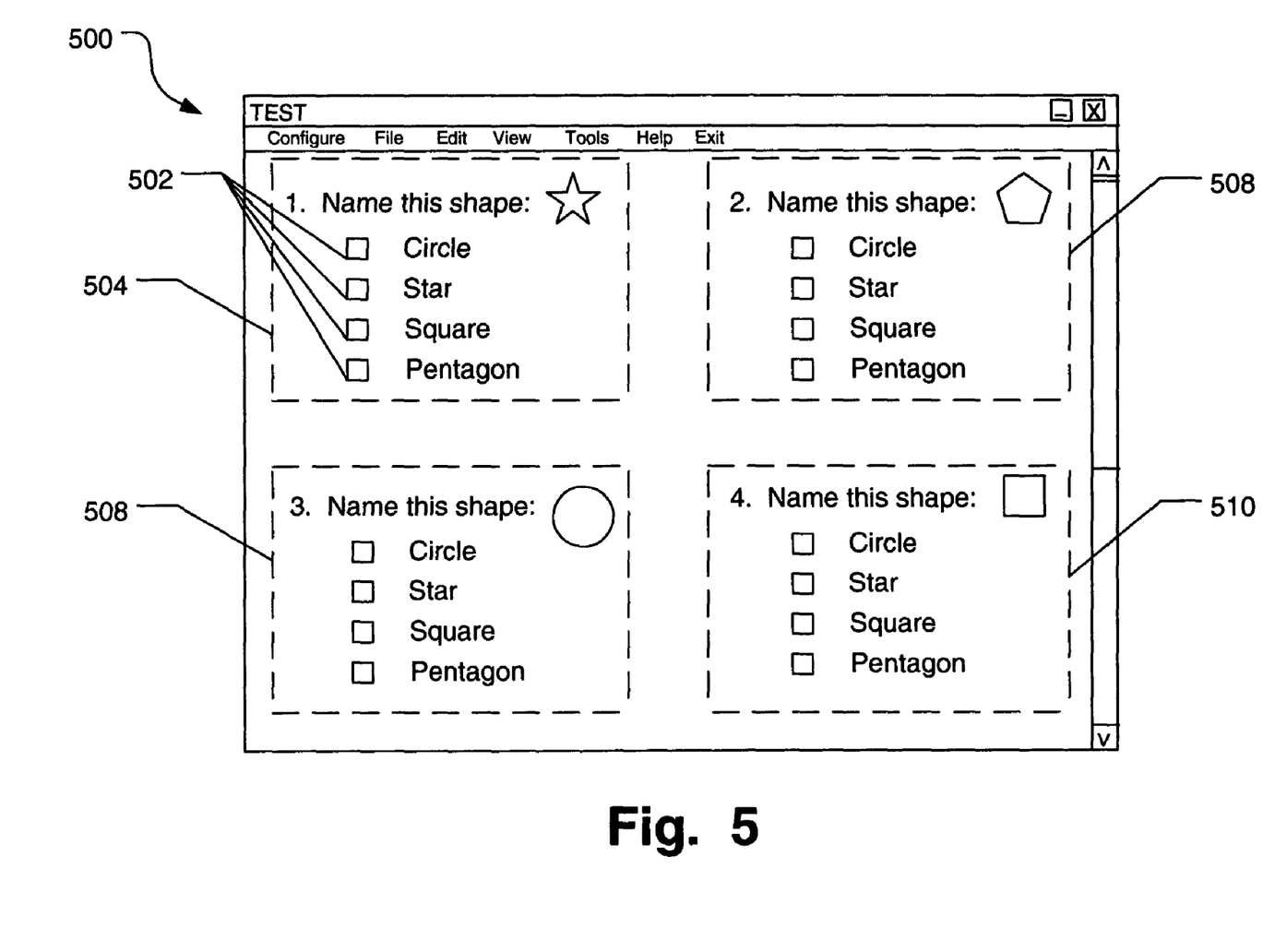
FIG. 5 illustrates another example rendering of a user interface in which stylus focus can be achieved according to some examples of this invention.

FIG. 5 illustrates another example of a user interface screen 500 having hierarchical control elements. When filling out a test or survey, the individual answers 502 may form individual "leaf" or "child" nodes or control elements of a hierarchical tree structure of control elements, whereas each question 504-510 may form a "root," "container," or "parent" node or control element having its own associated leaf or child nodes. Rather than making each child node or leaf node 502 separately stylus focusable, stylus focus could be reserved for the parent control elements 504-510. As the stylus hovers adjacent any portion of a parent control element 504-510, the entire parent control element 504-510 could receive stylus focus, enabling entry of input data to any of the individual leaf nodes 502 within that parent control element 504-510.

Figure 4:
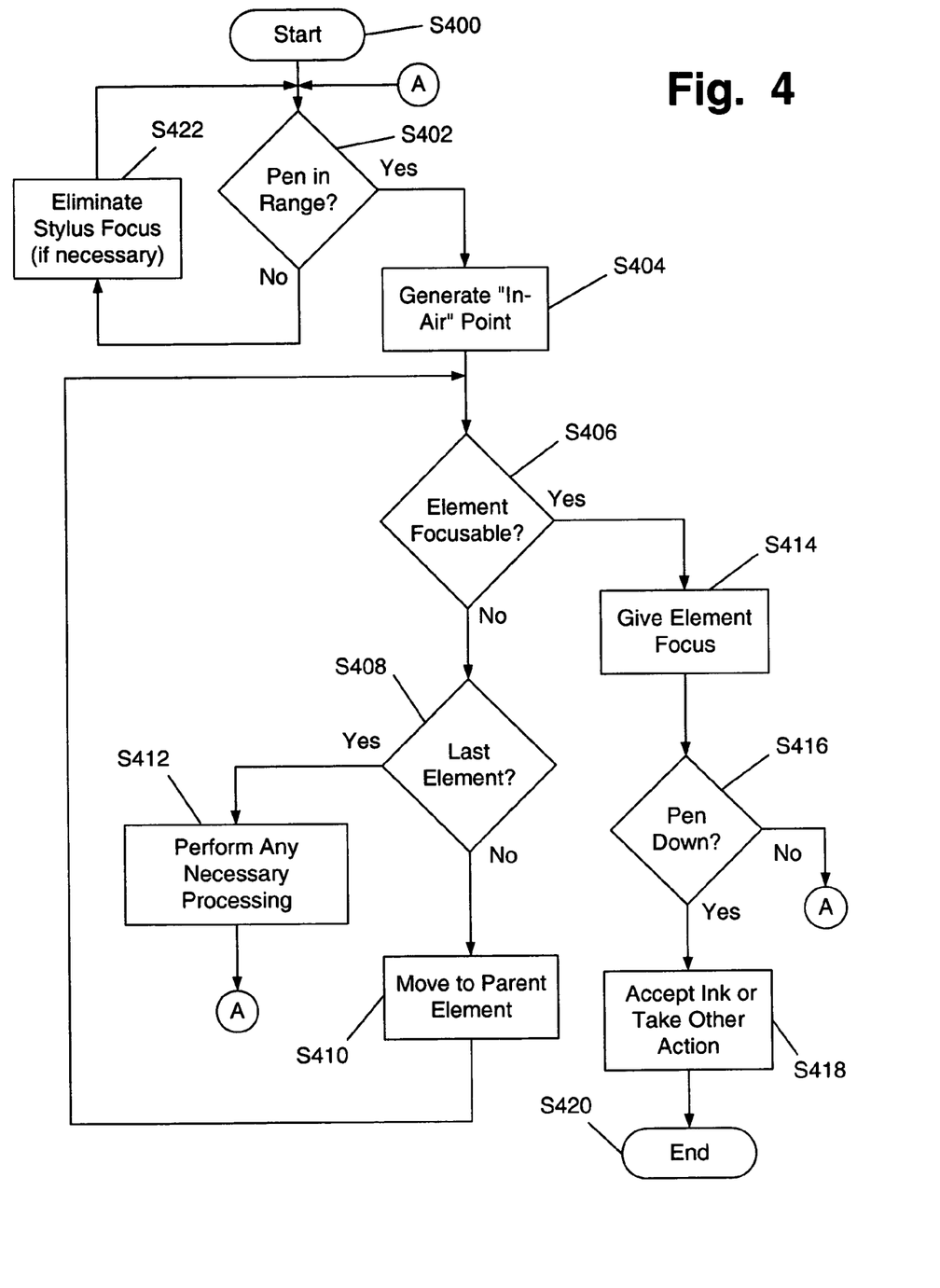
FIG. 4 illustrates a flow chart describing example methods of managing stylus focus in accordance with at least some examples of this invention.

Returning now to the example method illustrated in FIG. 4, as noted above, in-air points corresponding to the stylus's location are generated at S404. Systems and methods according to this example of the invention next determine whether the specific location and/or element adjacent to the stylus's location is stylus focusable at S406 (as noted above in conjunction with FIG. 5, not all control elements or areas in an interface need to be independently stylus focusable, and code associated with the operating system and/or application program can determine or set whether a specific control element or area is capable of receiving stylus focus). If the control element or underlying user interface location corresponding to the stylus's specific location is not stylus focusable (answer "No"), the systems and methods according to this example of the invention next determine whether that element is the last (or highest) element in the hierarchical structure (S408). If not (answer "No"), the systems and methods of this example of the invention move to the parent element (S410) and determine whether that element is stylus focusable by returning to S406. In the example illustrated in FIG. 5, if a user's pen initially hovered near a leaf element 502, systems and methods according to this example of the invention would determine at S406 that this leaf element 502 was not stylus focusable. Then, at S408, the systems and methods of this example would determine that leaf element 502 is contained within parent element 504, and then when S406 is repeated, it would be determined that element 504 is stylus focusable.

If, at S408, it is determined that the element under consideration is the last element in the hierarchical structure and/or the only element in the hierarchical structure (answer "Yes"), any necessary further processing can be performed, if any, (S412), and the procedure can return to S402 (bullet point A). Any suitable or desired processing can be performed without departing from the invention. For example, an error message or text box may be generated to provide suitable information to the user. As another possibility, a default stylus focus could be provided to the highest hierarchical element of the interface or to a predetermined portion of the interface. As still another possible example, if none of the element under the stylus or its parent element(s) (if any) are stylus focusable, then no element in the interface will receive stylus focus, in at least some examples of systems and methods according to this invention, and the systems and methods may wait for further stylus movement. Any other suitable ways of handing this situation could be used without departing from the invention.

If, at S406, it is determined that the element under consideration is stylus focusable (either the original control element near which the stylus is hovering or a parent element thereof-answer "Yes" at S406), systems and methods according to this example of the invention will then execute code to give stylus focus to that element (S414). The element that receives stylus focus may be notified of this fact (e.g., by the operating system and/or application program), and appropriate action can be taken and/or any desired processing may be performed (such as enlarging the control element size, increasing polling frequency, and the like, as will be described in more detail below). Alternatively, additional processing could be performed prior to determining whether to give this particular element stylus focus (as opposed to some other element in the interface, such as another element in the hierarchy, or no element (under some predetermined conditions)).

After stylus focus is established, systems and methods according to this example of the invention next determine whether the stylus has contacted the digitizer surface (S416). If "Yes," the system accepts the input (e.g., as electronic ink or other input) or takes other suitable action (S418), and the procedure ends (S420) (optionally, the procedure may return to S402 and wait for the next input). In this example of systems and methods according to the invention, once stylus focus is established and the user begins to input data or the system otherwise begins to receive input (e.g., by writing or in any other manner), stylus focus does not change during that pen-down event (optionally, even if the data entry (such as electronic ink entry) continues in an area outside the control element having focus). This assures that all data input during the pen-down event is sent to the control element in which the data input started (optionally, if the control element is movable in the user interface, the control element may move away from the pen during that pen-down event, but once focus is established, the incoming data during the pen-down event will continue to be received in the control element having focus, even if the element moves away from the pen during the event). Optionally, receipt of input data may terminate (and optionally focus may be lost) once the user input device moves outside the control element having focus during the pen-down event. To change stylus focus in some examples of this invention, the user must lift the stylus away from the digitizer surface (a pen-up event) a sufficient distance so that it cannot be detected by the digitizer and it is necessary to re-initiate the procedure of FIG. 4. As an alternative, stylus focus may be changed automatically after the pen is lifted from the digitizer surface and moved to an area on the user interface surface corresponding to another control element, even if the stylus always remains detectable by the digitizer throughout this time period. Optionally, stylus focus could change in the various situations described above only after a predetermined time delay and/or only after the stylus has moved a predetermined minimum distance from the previous control element having focus and/or from its last position associated with the previous control element having focus.

In at least some examples of the invention, if the pen initially contacts the digitizer in a region incapable of receiving focus or input (e.g., in an area between control elements capable of receiving focus), no focus will be established during this pen-down event even if the pen moves into a focusable control element during the pen-down event. As an alternative, if desired, focus could be established at the time (if any) that the pen crosses into a focusable control element during the pen-down event without departing from the invention. Optionally, if focus is established in the situation described above, the input into the focusable element may include all or at least some of the input data generated or entered during the pen-down event before the pen moved into the focusable control element.

If, at S416, systems and methods according to this example of the invention determine that the stylus has not contacted the digitizer screen, the procedure returns to S402 and determines whether the pen remains in range. If not (answer "No"), stylus focus may be withdrawn (S422), and attempts to detect the pen are resumed a short time later. If the stylus remains detectable (answer "Yes" at S402), the procedure is repeated until either a pen-down event occurs (i.e., the stylus contacts the digitizer surface) or the pen is withdrawn. While the stylus remains detectable (e.g., in a hovering position) and before the stylus contacts the digitizer surface, stylus focus may shift from control element to control element on the user interface screen as the stylus moves from an area representing one control element to an area representing another control element without departing from the invention. Also, at S422, if desired, stylus focus could remain in the last control element having focus, optionally for a predetermined time and/or until a new stylus focus is established.

The various procedures described above in conjunction with FIG. 4 are merely examples of appropriate processing that may occur in some examples of the invention. Those skilled in the art will recognize that other procedures may be performed and/or that the procedures described in conjunction with FIG. 4 may be altered without departing from the invention. For example, the specific steps illustrated or described may be changed, their order may be changed, some steps may be omitted, and/or additional steps may be added without departing from the invention. As one more specific example, the manner of determining which control element representation is located near the pen's location may be changed from the "hit-testing" procedure described above without departing from the invention. Additionally, the operating system and/or application program can be designed to perform some or all of the in-air focus management determination procedures like those illustrated and described in conjunction with FIG. 4 at any suitable time interval as convenient or desired without departing from the invention. For example, in situations where a high volume of background processing is taking place, some or all of the in-air focus management procedures (such as the hit-testing) may be performed somewhat less frequently, to increase processor availability for other processing. Additionally, the procedures described above may occur less frequently, for example, if the computer is in a low-power, sleep, or battery conservation mode.

Figure 6:
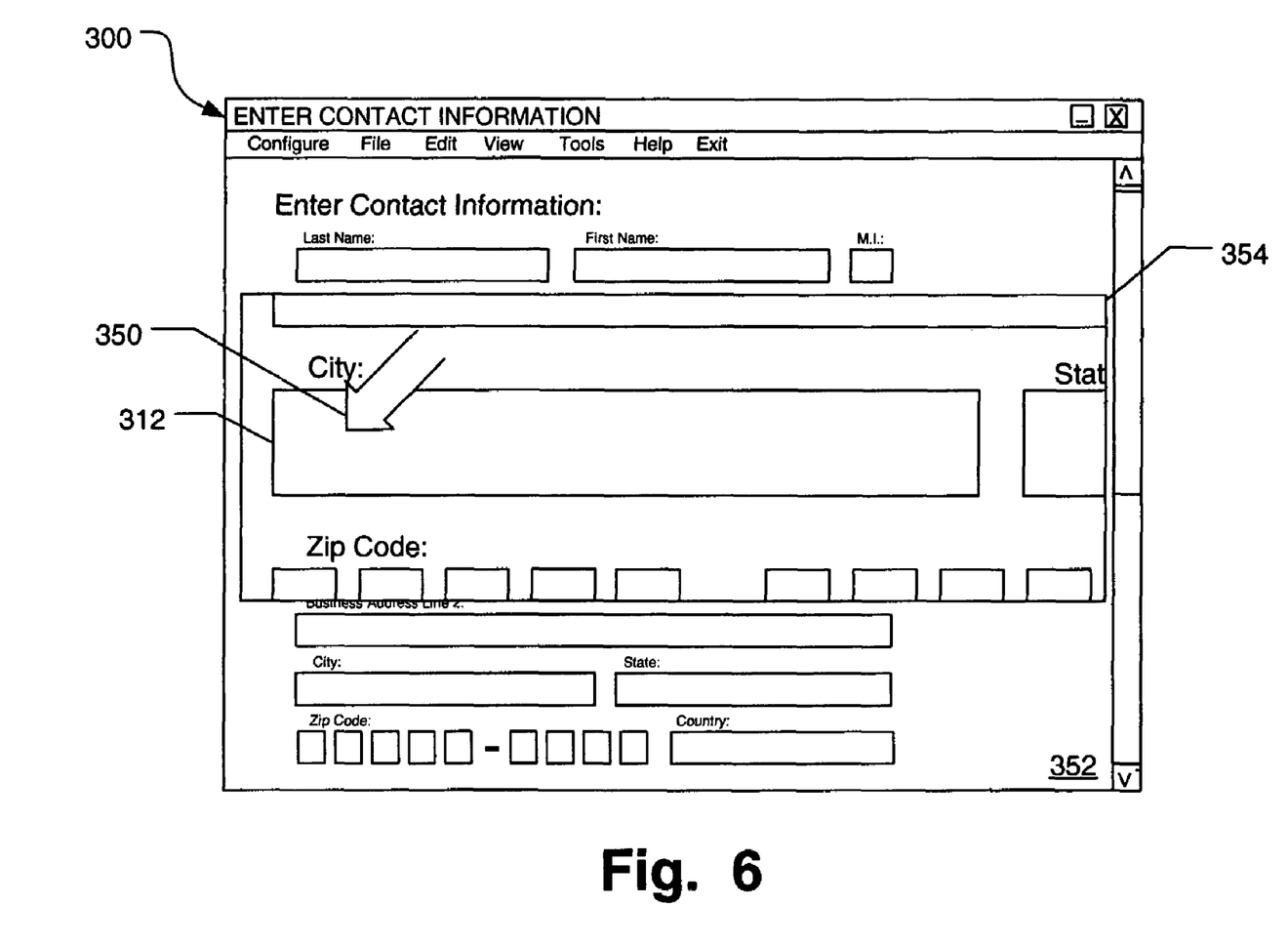
FIG. 6 illustrates an example rendering of a user interface after stylus focus has been achieved in which the control element having focus becomes enlarged.

Any appropriate action or processing may occur or be initiated as a result of obtaining stylus focus without departing from this invention. For example, any visual or audio indicator may be provided to indicate when stylus focus is established, such as color change, user interface style change, a user interface layout change, an audible beep, or the like. FIGS. 3 and 6 illustrate another example of potential processing that may result from a control element receiving stylus focus. As described above, FIG. 3 illustrates a user interface screen 332 having various control elements 302-330. Arrow 350 in FIG. 3 illustrates a stylus approaching the interface screen 332 but hovering adjacent the screen 332 at a position such that the digitizer associated with the screen 332 detects the presence and position of the stylus. Once stylus focus is established, the user interface changes in this example of the invention to the screen 352 shown in FIG. 6. Specifically, in this example, the stylus approached the screen 332 adjacent control element 312 (associated with the "city" control element of the "home address" control element of the interface). As shown in FIG. 6, when stylus focus was established in control element 312, the size of this control element 312 was expanded, and it will remain at this expanded size as long as stylus focus remains within control element 312. In at least some examples, the stylus location 350 in the enlarged box 354 will be at the same relative location as the stylus location 350 in the control element 312 before its size was enlarged (to provide a smooth transition for the user between the small size and the enlarged size). Enlarging the size of the control elements having focus can be particularly useful in pen-based computing systems where a user intends to write and enter electronic ink in the control element (if the control element is small, it may be difficult or impossible for the user to enter the necessary data using an electronic pen and/or electronic ink). Also, enlarging the size can be useful in situations where the overall user interface, screen size, and/or control element(s) are quite small.

If the stylus moves outside of control element 312 in this example of the invention, stylus focus in this element 312 will be lost, and the enlarged box 354 will disappear. Optionally, loss of stylus focus may occur only after expiration of a predetermined time period after the stylus leaves the control element 312 or moves out of the digitizer detection range, to prevent loss of stylus focus due to minor, unintended stylus movements by the user. As still another alternative, stylus focus could remain on this element 312 until any other suitable time, such as until the stylus is no longer detected proximate to the digitizer, until a new focus is established, and/or at any other suitable or desired time. As still another alternative, the enlarged box 354 may contain neighboring control elements in addition to the originally centered control element such that stylus focus could shift from the original control element (control element 312 in the above example) to one of its neighboring control elements without the enlarged box 354 disappearing. Any other desired way of handling stylus movement outside the original element having focus may be used without departing from the invention.

Additional and/or other action also may occur as a result of obtaining stylus focus without departing from the invention. For example, achieving stylus focus could be used to "prepare" the overall system and/or the specific control element to receive input. As a more specific example, stylus focus could be used to "wake" the system from a power-saving mode or from a "stand-by" mode. As another example, achieving stylus focus may be used as a trigger by the system to more frequently check the area associated with the control element for input (e.g., prompt the digitizer to more frequently check or "poll" for incoming electronic ink or other input data, optionally increasing the frequency particularly in the interface region corresponding to the control element having stylus focus).

As still additional examples, stylus focus may be used in advance of a pen-down event (e.g., while the pen hovers near the digitizer surface) to initiate a determination of various features or characteristics of the input data to be entered in the area having focus (e.g., determine ink color, ink highlighting characteristics, pen tip characteristics, whether ink data should be collected in a "pressure sensitive" manner, input data type (e.g., ink, erasure, highlighting, selection, etc.), etc.). Using the "in-air" time period to retrieve data relevant to ink characteristics for the region with focus may allow systems and methods according to at least some examples of the invention to very promptly and quickly begin rendering the ink when the pen-down event actually occurs, thereby providing a more natural pen and inking experience (e.g., ink will promptly appear when the pen-down event occurs, making it appear like ink is flowing out of the tip of the electronic pen and onto the electronic document).

As still another example, establishment of stylus focus may be used by systems and methods according to at least some examples of the invention in other ways to prepare the system to receive input electronic ink data. Input electronic ink in a pen-based computing system typically has a large volume of data associated with it (e.g., data associated with ink location, ink color, ink pressure, digitizer points intersected by the stylus, stylus movement direction, parsing data associated with the ink, stroke ID information, user ID information, language data, etc.). Stylus focus may be used by systems and methods according to at least some examples of the invention to prepare the system to receive ink, for example, by setting up and/or allocating data structures in memory to receive and store the ink data (e.g., in a hierarchical document tree format, etc.); setting up and/or allocating memory locations for mirror trees and snapshots of the ink, e.g., for layout analysis, classification, parsing, recognition, etc.; purging cached data from various memory locations; etc. Any other suitable or desired processing or activities may be triggered by or initiated as a result of achieving stylus focus without departing from this invention.

Systems and methods according to at least some examples of this invention also are not limited to providing and maintaining stylus focus associated with a single stylus. Any number of styli foci may be established and maintained without departing from the invention. For example, while one stylus focus may be detected, established, and maintained with respect to a first control element, the digitizer also may receive input indicating that a second stylus is located proximate to the digitizer and provide stylus focus to and maintain focus with a second control element corresponding to the location of the second stylus. Also, the second stylus could enter data in the area corresponding to the first control element (which already has stylus focus in this example) without departing from the invention.

In one more specific example of systems and methods according to this invention, in-air points are used to determine the control element having stylus focus. Only in-air points are used to change stylus focus in this example, because it is assumed that once an input ink stroke has started, all data associated with that stroke (i.e., during that pen-down event) should continue to be associated with that same control element (at least until the pen leaves the area of that control element, and optionally until a pen-up event occurs even if the pen leaves that control element's area). In this example, only one control element of the interface will have stylus focus at a given time. If the systems and methods according to this example of the invention are capable of receiving input from multiple styli, only styli within the control element having stylus focus will be capable of entering input ink, but all styli within the control element having focus will be capable of independently entering ink (or other input data). All other styli (those located outside the control element having stylus focus) will behave like a mouse. In this example, the control element having stylus focus will not lose stylus focus at least until all styli have left the area of the control element and/or are out of the detection range of the digitizer.

An additional, optional feature in accordance with at least some examples of this invention allows establishment of stylus focus as a result of contact between the stylus and the digitizer surface. In some instances, particularly if the computing system is in a low power or stand-by mode or when the digitizer is otherwise infrequently polling in an effort to detect the presence of a stylus, the stylus may contact the digitizer surface before it is detected in a hover orientation at a location proximate to the digitizer surface. This also can occur in instances where a user quickly places the pen on the digitizer surface and begins entering input. In such situations, systems and methods according to at least some examples of the invention may provide stylus focus to the control element at the location of (and as a result of) stylus contact with the digitizer surface and accept the input data, without requiring a tap to establish focus and a second pen-down event to begin entering data. Determination of the control element to receive stylus focus as a result of stylus contact can occur in any suitable manner, including, for example, hit-testing using (X, Y) coordinates of stylus contact, optionally upon consideration of a hierarchical arrangement of control elements and other user interface elements as described above.

If desired, stylus focus, as described above, may be maintained independent of and separate from a mouse focus and/or a keyboard focus and/or another stylus focus without departing from this invention. Accordingly, while one user initiates and maintains stylus focus, other users (or the same user) could also enter data in different control elements using a mouse and/or a keyboard and/or another stylus.

Also, focus need not be established in every instance in response to detection of a stylus proximate to a digitizer surface. If desired, an application program and/or an operating system may include code and/or send an event to refuse focus and/or to shut down the data transmissions associated with establishing focus, at least in some instances, without departing from this invention. For example, if an element has no area for receiving input electronic ink (such as a text label or an unchangeable picture element), there may be no reason to enable that element to receive focus. Additionally, if an element has reached the limit on electronic ink that it is able to receive for some reason, focus on that element may be refused. As still another example, in fields where users can or are intended to only write one time (such as user ID and/or password fields or the like), focus may not be accepted if ink already exists or has been entered in that field (optionally, after expiration of a certain time period). Focus refusal may be applied on a control element-by-control element basis or in any other manner without departing from the invention.

Finally, the present invention also relates to computer-readable media including computer-executable instructions stored thereon for performing various methods and/or for use in various systems, including those systems and methods described above. The computer-readable media may constitute computer-executable instructions stored on the various specific examples of computer-readable media described above.

V. CONCLUSION

In some instances, the above specification describes stylus and mouse interaction with and locations respect to "control elements" in a user interface. This is a shorthand description used for ease of communication and convenience. In actuality, a "control element" includes computer code that exists in an application program and/or an operating system program of the computer. Accordingly, those skilled in the art will understand this shorthand description as describing that the stylus and mouse actually are located proximate to representations of the various control element(s) that exist on or as part of the user interface. Those skilled in the art will further understand that these interactions can activate, send input to, and/or otherwise utilize the underlying control element(s) represented in the user interface.

Various examples of the present invention have been described above, and it will be understood by those of ordinary skill that the present invention includes within its scope all combinations and subcombinations of these examples. Additionally, those skilled in the art will recognize that the above examples simply exemplify various aspects of the invention. Various changes and modifications may be made without departing from the spirit and scope of the invention, as defined in the appended claims.

The invention claimed is:

1. A method, comprising:
   receiving input indicating that a first stylus is located proximate to a digitizer in a hovering orientation, wherein the first stylus does not contact a surface of the digitizer in the hovering orientation;
   determining a location of the first stylus in the hovering orientation with respect to representations of plural control elements of a user interface on a screen; and
   providing focus to a first control element corresponding to the determined location of the first stylus in the hovering orientation by designating the first control element for receiving input, wherein providing focus includes determining whether the first control element is stylus-focusable, where:
      in response to determining that the first control element is stylus-focusable:
         providing focus to the first control element; and
         accepting input in the first control element;
      in response to determining that the first control element is not stylus-focusable:
         determining whether a parent element of the first control element is stylus focusable, the parent element including the first control element; and
      in response to determining that the parent element of the first control element is stylus-focusable:
         providing focus to the parent element; and
         accepting input in the parent element.

2. A method according to claim 1, wherein the input includes electronic ink.

3. A method according to claim 1, further comprising:
   moving the first stylus away from the digitizer without contacting the surface of the digitizer such that the input indicating first stylus proximity is no longer received; and
   withdrawing focus from the first control element.

4. A method according to claim 1, wherein providing focus includes rendering an enlarged view of at least a portion of a representation of the first control element.

5. A method according to claim 1, wherein providing focus includes providing an enlarged area for accepting input directed to the first control element.

6. A method according to claim 1, further comprising:
   maintaining a mouse focus separate from the focus corresponding to the first stylus location in the hovering orientation.

7. A method according to claim 1, further comprising:
   maintaining a keyboard focus separate from the focus corresponding to the first stylus location in the hovering orientation.

8. A method according to claim 1, further comprising:
   preparing the first control element to receive input.

9. A method according to claim 8, wherein the preparing includes increasing a polling frequency in an area of the digitizer corresponding to the first control element.

10. A method according to claim 1, further comprising:
    receiving a second input indicating that a second stylus is located proximate to the digitizer in a hovering orientation.

11. A method according to claim 10, further comprising:
    providing focus to a second control element corresponding to a location of the second stylus in the hovering orientation.

12. A method according to claim 11, wherein focus to the second control element is provided concurrent with focus to the first control element.

13. A method according to claim 1, further comprising:
    moving the first stylus from a first area corresponding to the first control element to a second area corresponding to a second control element; and
    changing focus from the first control element to the second control element.

14. A method according to claim 13, wherein the first stylus does not contact a surface of the digitizer prior to moving from the first area to the second area.

15. A method according to claim 14, wherein the first stylus contacts a surface of the digitizer prior to moving from the first area to the second area.

16. A method according to claim 1, further comprising providing at least one of a visual or audio indicator when focus is provided.

17. The method of claim 1, wherein accepting input in an area of the digitizer representing the first control element includes receiving input in the area of the digitizer representing the first control element.

18. A method, comprising:
    determining whether a first stylus is located proximate to a surface of a digitizer in a hovering orientation, wherein the first stylus does not contact the surface of the digitizer in the hovering orientation;
    determining a location of a first stylus in a hovering orientation;

providing focus to a first control element corresponding to the determined location of the first stylus by designating the first control element for receiving input in response to: (a) a
determination that the first stylus is located proximate to the digitizer in the hovering orientation, or (b) contact between the first stylus and the surface of the digitizer; and
accepting input in an area of the digitizer representing the first control element, wherein providing focus includes determining whether the first control element is stylus-focusable, where:
in response to determining that the first control element is stylus-focusable:
providing focus to the first control element; and
accepting input in the first control element;
in response to determining that the first control element is not stylus-focusable:
determining whether a parent element of the first control element is stylus focusable, the parent element including the first control element; and
in response to determining that the parent element of the first control element is stylus-focusable:
providing focus to the parent element; and
accepting input in the parent element.

19. A method according to claim 18, further comprising: determining that the first stylus is located proximate to the digitizer surface and providing the focus in response to this determination.

20. A method according to claim 18, further comprising: sensing contact between the first stylus and the surface of the digitizer and providing the focus in response to the sensing.

21. A method according to claim 18, wherein the input comprises electronic ink.

22. A method according to claim 18, wherein providing focus includes providing an enlarged area for accepting input directed to the first control element.

23. A method according to claim 18, further comprising: preparing the first control element to receive input.

24. A method according to claim 23, wherein the preparing includes increasing a polling frequency in an area of the digitizer corresponding to the first control element.

25. A method according to claim 18, further comprising: determining whether a second stylus is located proximate to the surface of the digitizer in a hovering orientation.

26. A method according to claim 25, further comprising: providing focus to a second control element when a location of the second stylus corresponds to an area of the digitizer representing the second control element in response to: (a) a determination that the second stylus is located proximate to the digitizer in the hovering orientation, or (b) contact between the second stylus and the surface of the digitizer.

27. A method according to claim 26, wherein focus to the second control element is provided concurrent with focus to the first control element.

28. A method according to claim 18, further comprising: moving the first stylus from a first area corresponding to the first control element to a second area corresponding to a second control element; and
changing focus from the first control element to the second control element.

29. A method according to claim 18, further comprising providing at least one of a visual or audio indicator when focus is provided.

30. The method of claim 18, wherein accepting input in an area of the digitizer representing the first control element includes receiving input in the area of the digitizer representing the first control element.

31. A system, comprising:
an input device adapted to generate an input indicating that a first stylus is located proximate to a digitizer in a hovering orientation, wherein the first stylus does not contact a surface of the digitizer in the hovering orientation; and
a processor programmed and adapted to:
determine a location of the first stylus in the hovering orientation; and
provide focus to a first control element corresponding to the determined location of the first stylus in the hovering orientation by designating the first control element for receiving input, wherein providing focus includes determining whether the first control element is stylus-focusable, where:
in response to determining that the first control element is stylus-focusable:
providing focus to the first control element; and
accepting input in the first control element;
in response to determining that the first control element is not stylus-focusable:
determining whether a parent element of the first control element is stylus focusable, the parent element including the first control element; and
in response to determining that the parent element of the first control element is stylus-focusable:
providing focus to the parent element; and
accepting input in the parent element.

32. A system according to claim 31, wherein the input includes electronic ink input.

33. A system according to claim 31, wherein the processor is further programmed and adapted to withdraw focus from the first control element when the first stylus is moved away from the digitizer without contacting the surface of the digitizer to an extent such that the input indicating first stylus proximity is no longer received.

34. A system according to claim 31, wherein the processor is further programmed and adapted to determine the location of the first stylus in the hovering orientation with respect to representations of plural control elements of a user interface on a screen prior to providing the focus.

35. A system according to claim 31, wherein the processor is further programmed and adapted to provide an enlarged area for accepting input directed to the first control element in response to the first control element receiving focus.

36. A system according to claim 31, wherein the processor is further programmed and adapted to maintain a mouse focus separate from the focus corresponding to the first stylus location in the hovering orientation.

37. A system according to claim 31, wherein the processor is further programmed and adapted to maintain a keyboard focus separate from the focus corresponding to the first stylus location in the hovering orientation.

38. A system according to claim 31, wherein the processor is further programmed and adapted to prepare the first control element to receive input in response to receiving the focus.

39. A system according to claim 38, wherein the processor is programmed and adapted to prepare the first control element to receive input by increasing a polling frequency in an area of the digitizer corresponding to the first control element.

40. A system according to claim 31, wherein the input device is further adapted to generate a second input indicating that a second stylus is located proximate the digitizer in a hovering orientation.

41. A system according to claim 40, wherein the processor is further programmed and adapted to provide focus to a second control element corresponding to a location of the second stylus in the hovering orientation in response to the second input.

42. A system according to claim 41, wherein focus to the second control element is provided concurrent with focus to the first control element.

43. A system according to claim 31, wherein the processor is further programmed and adapted to change focus from the first control element to a second control element when the first stylus is moved from a first area corresponding to the first control element to a second area corresponding to the second control element.

44. A system according to claim 31, wherein the processor is further programmed and adapted to provide at least one of a visual or audio indicator when focus is provided.

45. The system of claim 31, wherein the processor is further configured to receive input in the area of the digitizer corresponding to the first control element when the processor is configured to accept input in the area of the digitizer corresponding to the first control element.

46. A system, comprising:
an input device adapted to generate an input indicating when a first stylus is located proximate a surface of a digitizer in a hovering orientation, wherein the first stylus does not contact the surface of the digitizer in the hovering orientation; and
a processor programmed and adapted to:
determine a location of the first stylus in the hovering orientation,
provide focus to a first control element corresponding to the determined location of the first stylus by designating the first control element for receiving input in response to: (a) a determination that the first stylus is located proximate to the digitizer in the hovering orientation, or (b) contact between the first stylus and the surface of the digitizer, and
accept input in an area of the digitizer corresponding to the first control element when focus is provided to the first control element, wherein providing focus includes determining whether the first control element is stylus-focusable, where:
in response to determining that the first control element is stylus-focusable:
providing focus to the first control element; and
accepting input in the first control element;
in response to determining that the first control element is not stylus-focusable:
determining whether a parent element of the first control element is stylus focusable, the parent element including the first control element; and
in response to determining that the parent element of the first control element is stylus-focusable:
providing focus to the parent element; and
accepting input in the parent element.

47. A system according to claim 46, wherein the input comprises electronic ink.

48. A system according to claim 46, wherein the processor is further programmed and adapted to provide an enlarged area for accepting input directed to the first control element in response to the first control element receiving focus.

49. A system according to claim 46, wherein the processor is further programmed and adapted to prepare the first control element to receive input in response to receiving the focus.

50. A system according to claim 49, wherein the processor is programmed and adapted to prepare the first control element to receive the input by increasing a polling frequency in an area of the digitizer corresponding to the first control element.

51. A system according to claim 46, wherein the input device is further adapted to generate a second input indicating that a second stylus is located proximate the digitizer in a hovering orientation.

52. A system according to claim 51, wherein the processor is further programmed and adapted to provide focus to a second control element when a location of the second stylus corresponds to an area of the digitizer representing the second control element in response to: (a) a determination that the second stylus is located proximate to the digitizer in the hovering orientation, or (b) contact between the second stylus and the surface of the digitizer.

53. A system according to claim 52, wherein focus to the second control element is provided concurrent with focus to the first control element.

54. A system according to claim 46, wherein the processor is further programmed and adapted to change focus from the first control element to a second control element when the first stylus is moved from a first area corresponding to the first control element to a second area corresponding to the second control element.

55. A system according to claim 46, wherein the processor is further programmed and adapted to provide at least one of a visual or audio indicator when focus is provided.

56. A computer-readable storage medium including computer-executable instructions stored thereon for performing a method comprising:
receiving input indicating that a first stylus is located proximate to a digitizer in a hovering orientation, wherein the first stylus does not contact a surface of the digitizer in the hovering orientation;
determining a location of the first stylus in the hovering orientation;
providing focus to a first control element corresponding to the determined location of the first stylus in the hovering orientation by designating the first control element for receiving input, wherein providing focus includes determining whether the first control element is stylus-focusable, where:
in response to determining that the first control element is stylus-focusable:
providing focus to the first control element; and
accepting input in the first control element;
in response to determining that the first control element is not stylus-focusable:
determining whether a parent element of the first control element is stylus focusable, the parent element including the first control element; and
in response to determining that the parent element of the first control element is stylus-focusable:
providing focus to the parent element; and
accepting input in the parent element.

57. A computer-readable storage medium according to claim 56, wherein the input includes electronic ink.

58. A computer-readable storage medium according to claim 56, wherein the method further includes:
withdrawing focus from the first control element when the first stylus is moved away from the digitizer without contacting the surface of the digitizer such that the input indicating first stylus proximity is no longer received.

59. A computer-readable storage medium according to claim 56, wherein the method further includes:

providing an enlarged area for accepting input directed to the first control element in response to receiving the focus.

60. A computer-readable storage medium according to claim 56, wherein the method further includes:

increasing a polling frequency in the area of the digitizer corresponding to the first control element.

61. A computer-readable storage medium according to claim 56, wherein the method further includes:

receiving a second input indicating that a second stylus is located proximate the digitizer in a hovering orientation.

62. A computer-readable storage medium according to claim 61, wherein the method further includes:

providing focus to a second control element corresponding to a location of the second stylus in the hovering orientation in response to the second input.

63. A computer-readable storage medium according to claim 56, wherein the method further includes:

changing focus from the first control element to the second control element when the first stylus is moved from a first area corresponding to the first control element to a second area corresponding to a second control element.

64. A computer-readable storage medium according to claim 56, wherein the method further includes providing at least one of a visual or audio indicator when focus is provided.

65. A computer-readable storage medium including computer-executable instructions stored thereon for performing a method comprising:

determining whether a first stylus is located proximate to a surface of a digitizer in a hovering orientation, wherein the first stylus does not contact the surface of the digitizer in instructions stored thereon for performing a method comprising:

determining whether a first stylus is located proximate to a surface of a digitizer in a hovering orientation, wherein the first stylus does not contact the surface of the digitizer in the hovering orientation;

determining a location of the first stylus in the hovering orientation;

determining whether a first control element corresponding to the determined location of the first stylus is stylus-focusable; and in response to determining that the first control element is not stylus-focusable:

determining whether a parent element of the first control element is stylus focusable, the parent element including the first control element; and in response to determining that the parent element of the first control element is stylus-focusable, providing focus to the parent element including accepting input in the parent element.

66. A computer-readable storage medium according to claim 65, wherein the input comprises electronic ink.

67. A computer-readable storage medium according to claim 65, wherein the method further includes:

providing an enlarged area for accepting input directed to the parent element in response to receiving the focus.

68. A computer-readable storage medium according to claim 65, wherein the method further includes:

increasing a polling frequency in the area of the digitizer corresponding to the parent element.

69. A computer-readable storage medium according to claim 65, wherein the method further includes:

determining whether a second stylus is located proximate to the surface of the digitizer in a hovering orientation.

70. A computer-readable storage medium according to claim 69, wherein the method further includes:

providing focus to a second control element when a location of the second stylus corresponds to an area of the digitizer representing the second control element in response to: (a) a determination that the second stylus is located proximate to the digitizer in the hovering orientation, or (b) contact between the second stylus and the surface of the digitizer.

71. A computer-readable storage medium according to claim 65, wherein the method further includes:

changing focus from the parent element to a second control element when the first stylus is moved from a first area corresponding to the parent element to a second area corresponding to the second control element.

72. A computer-readable storage medium according to claim 65, wherein the method further includes providing at least one of a visual or audio indicator when focus is provided.

* * * * *